US011685806B2

(12) United States Patent
Makal et al.

(10) Patent No.: US 11,685,806 B2
(45) Date of Patent: Jun. 27, 2023

(54) MELT PROCESSABLE THERMOPLASTIC POLYURETHANE-UREA ELASTOMERS

(71) Applicant: Lubrizol Advanced Materials, Inc., Cleveland, OH (US)

(72) Inventors: Umit G. Makal, Istanbul (TR); George H. Loeber, Elyria, OH (US); Lalith B. Suragani Venu, North Royalton, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 159 days.

(21) Appl. No.: 17/172,144

(22) Filed: Feb. 10, 2021

(65) Prior Publication Data

US 2021/0163672 A1     Jun. 3, 2021

Related U.S. Application Data

(62) Division of application No. 16/086,372, filed as application No. PCT/US2017/022957 on Mar. 17, 2017, now abandoned.

(60) Provisional application No. 62/311,445, filed on Mar. 22, 2016.

(51) Int. Cl.
| | |
|---|---|
| *B29C 48/00* | (2019.01) |
| *B29B 9/06* | (2006.01) |
| *C08G 18/32* | (2006.01) |
| *C08G 18/76* | (2006.01) |
| *C08G 18/44* | (2006.01) |
| *C08G 18/66* | (2006.01) |
| *C08G 18/08* | (2006.01) |
| *C08G 18/42* | (2006.01) |
| *C08G 18/48* | (2006.01) |
| *C08J 3/12* | (2006.01) |
| *B29K 75/00* | (2006.01) |

(52) U.S. Cl.
CPC .......... *C08G 18/7671* (2013.01); *B29B 9/065* (2013.01); *C08G 18/0895* (2013.01); *C08G 18/324* (2013.01); *C08G 18/3206* (2013.01); *C08G 18/4238* (2013.01); *C08G 18/4277* (2013.01); *C08G 18/44* (2013.01); *C08G 18/4854* (2013.01); *C08G 18/6648* (2013.01); *C08G 18/6651* (2013.01); *C08G 18/6685* (2013.01); *C08J 3/12* (2013.01); *B29C 48/00* (2019.02); *B29C 48/022* (2019.02); *B29K 2075/00* (2013.01)

(58) Field of Classification Search
CPC ............ C08G 18/3206; C08G 18/4238; C08G 18/324; C08G 18/6648; C08G 18/6651; C08G 18/6685
See application file for complete search history.

(56) References Cited

U.S. PATENT DOCUMENTS

| | | |
|---|---|---|
| 4,296,212 A | 10/1981 | Ewen |
| 4,722,989 A | 2/1988 | Starner et al. |
| 5,811,506 A | 9/1998 | Slagel |
| 6,562,932 B1 | 5/2003 | Markusch |
| 6,562,952 B1 | 5/2003 | Rajewski et al. |
| 6,613,867 B2 | 9/2003 | Sonnenschein et al. |
| 2007/0203320 A1 | 8/2007 | Gestermann |
| 2009/0105013 A1 | 4/2009 | Slagel |
| 2014/0322544 A1 | 10/2014 | Albach |
| 2015/0072118 A1 | 3/2015 | Hsieh |
| 2015/0232606 A1 | 8/2015 | Wamprecht |

FOREIGN PATENT DOCUMENTS

| | | | |
|---|---|---|---|
| AU | 2008202564 | 1/2009 | |
| DE | 2059570 A | * 12/1970 | ......... C08G 18/0895 |
| EP | 1302491 A1 | 4/2003 | |
| WO | 9744373 | 11/1997 | |
| WO | 01/91551 | 12/2001 | |
| WO | 2014/168700 | 10/2014 | |

OTHER PUBLICATIONS

DE-2059570_12-1970_English Translation.*

* cited by examiner

*Primary Examiner* — Michael L Leonard
(74) *Attorney, Agent, or Firm* — Eryn Ace Fuhrer; Michael A. Miller

(57) ABSTRACT

The present invention relates to a melt processable thermoplastic polyurethane-urea composition formed by a continuous bulk process without the presence of solvent using a polyol component, an isocyanate component, and chain extender component comprising a hindered aromatic diamine.

15 Claims, No Drawings

MELT PROCESSABLE THERMOPLASTIC POLYURETHANE-UREA ELASTOMERS

CROSS REFERENCE TO RELATED APPLICATION

This application is a divisional of U.S. application Ser. No. 16/086,372 filed on Sep. 19, 2018, which claims priority from PCT Application Serial No. PCT/US2017/022957 filed on Mar. 17, 2017, which claims the benefit of U.S. Provisional Application No. 62/311,445 filed on Mar. 22, 2016, the entirety of all of which are hereby incorporated by reference.

BACKGROUND OF THE INVENTION

The present invention relates to melt processable thermoplastic polyurethane-urea elastomers, and more specifically to thermoplastic polyurethane-urea elastomers that are prepared in a continuous manner, including elastomers that are prepared in a reactive extruder and/or similar equipment.

Polyurea and/or copolyurea elastomers are typically derived from the reaction of an isocyanate and a synthetic resin blend component via a step-growth polymerization. The resin blend component usually includes amine-terminated compounds. Processes for preparing copolyurea elastomers generally utilize a prepolymer process because they cannot be completed in a continuous bulk-polymerization process in a reactive extruder. Because amines react so rapidly with isocyanate groups, the reaction is difficult to control, and therefore, the reaction to make copolyurea elastomers is generally restricted to reaction injection molding (RIM) processes. Even with the use of sterically hindered amine chain extenders, the polymerization reaction for making polyureas proceeds so quickly that the processes for making molded articles are limited. Often the reaction to form polyurea compositions must be carried out in the presence of solvent and/or some other exotherm-controlling medium. Further, amines engage in a variety of secondary reactions with isocyanates at room temperature causing cross-linking in the reaction product, such that the composition is not melt-processable once formed. It would be desirable to provide a thermoplastic polyurethane-urea composition that can be made in a continuous bulk-polymerization process in a reactive extruder without solvent. Further, it would be desirable to provide a thermoplastic polyurethane-urea elastomer which can be formed into pellets capable of being re-melted and processed into articles.

In addition, often melt-processable thermoplastic products are not able to pass certain heat-aging tests. Accordingly it would be desirable to provide a thermoplastic polyurethane-urea composition that is able to pass heat-aging tests in order to broaden the potential applications for the composition.

SUMMARY OF THE INVENTION

The present invention relates to a thermoplastic polyurethane-urea composition that can be made by continuous bulk polymerization in a reactive extruder. The continuous bulk polymerization process may also be described as a one-shot reaction process (as opposed to a pre-polymer process) which is carried out in a reactive extruder without a solvent.

In one embodiment, the invention comprises a thermoplastic polyurethane-urea elastomer comprising the reaction product of (a) a polyol component; (b) an isocyanate component; and (c) a chain extender component comprising a hindered aromatic diamine, wherein the composition is made in a one-shot reaction process without solvent in a reactive extruder. In one embodiment, the composition comprises less than about 20 mol % urea. As used herein mol % urea means the % mols of amine containing moieties to the total number of mols of reactants.

In one embodiment, the composition is in the form of pellets which can be melt-processed to make articles from the thermoplastic polyurethane-urea composition.

One embodiment of the invention provides a process for making a melt-processable thermoplastic polyurethane-urea elastomer, wherein the process comprises (1) adding a reaction mixture to a heated extruder, said reaction mixture comprising (a) a polyol component, (b) an isocyanate component, and (c) a chain extender component comprising a hindered aromatic diamine; (2) reacting said polyol component, said isocyanate component, and said chain extender component in a one-shot polymerization process in said heated extruder to form a thermoplastic polyurethane-urea elastomer composition; and (3) cooling said thermoplastic polyurethane-urea elastomer composition. The process may further comprise a step of (4) processing said thermoplastic polyurethane-urea composition, wherein the processing step comprises forming pellets of the thermoplastic polyurethane-urea composition.

Another embodiment of the invention is making an article from a thermoplastic polyurethane-urea composition. The process for making an article comprises (1) adding a reaction mixture to a heated extruder said reaction mixture comprising (a) a polyol component, (b) an isocyanate component, and (c) a chain extender component comprising a hindered aromatic diamine; (2) reacting said polyol component, said isocyanate component, and said chain extender component in a one-shot polymerization process in said heated extruder to form a thermoplastic polyurethane-urea elastomer composition; and (3) cooling said thermoplastic polyurethane-urea elastomer composition. The process may further comprise a step of (4) processing said thermoplastic polyurethane-urea composition, wherein the processing step comprises forming pellets of the thermoplastic polyurethane-urea composition. The process may also further comprise the steps of melting said thermoplastic polyurethane-urea elastomer composition and also molding the melted thermoplastic polyurethane-urea elastomer composition into an article.

DETAILED DESCRIPTION OF THE INVENTION

Various features and embodiments of the invention will be described below by way of non-limiting illustration. The thermoplastic polyurethane-urea composition of the present invention comprise the reaction product of (a) a polyol component; (b) an isocyanate component and (c) a chain extender component wherein the chain extender component comprises a hindered aromatic diamine.

The Polyol Component

The TPU compositions described herein are made using a polyol component. Polyols, which may also be described as hydroxyl terminated intermediates, may include one or more hydroxyl terminated polyesters, one or more hydroxyl terminated polyethers, one or more hydroxyl terminated polycarbonates, one or more hydroxyl terminated polysiloxanes, or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ε-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is a preferred acid. The glycols which are reacted to form a desirable polyester intermediate can be aliphatic, aromatic, or combinations thereof, including any of the glycols described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

The polyol component may also include one or more polycaprolactone polyester polyols. The polycaprolactone polyester polyols useful in the technology described herein include polyester diols derived from caprolactone monomers. The polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycols and/or diols listed herein. In some embodiments, the polycaprolactone polyester polyols are linear polyester diols derived from caprolactone monomers.

Useful examples include CAPA™ 2202A, a 2,000 number average molecular weight (Mn) linear polyester diol, and CAPA™ 2302A, a 3,000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, 1,6-hexanediol, 2,2-dimethyl-1,3-propanediol, or any combination thereof. In some embodiments, the diol used to prepare the polycaprolactone polyester polyol is linear. In some embodiments, the polycaprolactone polyester polyol is prepared from 1,4-butanediol. In some embodiments, the polycaprolactone polyester polyol has a number average molecular weight from 500 to 10,000, or from 500 to 5,000, or from 1,000 or even 2,000 to 4,000 or even 3,000.

Suitable hydroxyl terminated polyether intermediates include polyether polyols derived from a diol or polyol having a total of from 2 to 15 carbon atoms, in some embodiments an alkyl diol or glycol which is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly(propylene glycol) comprising propylene oxide reacted with propylene glycol, poly(tetramethylene ether glycol) comprising water reacted with tetrahydrofuran which can also be described as polymerized tetrahydrofuran, and which is commonly referred to as PTMEG. In some embodiments, the polyether intermediate includes PTMEG. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the described compositions. Typical copolyethers include the reaction product of THF and ethylene oxide or THF and propylene oxide. These are available from BASF as PolyTHF® B, a block copolymer, and PolyTHF® R, a random copolymer. The various polyether intermediates generally have a number average molecular weight (Mn) as determined by assay of the terminal functional groups which is an average molecular weight greater than about 700, such as from about 700 to about 10,000, from about 1,000 to about 5,000, or from about 1,000 to about 2,500. In some embodiments, the polyether intermediate includes a blend of two or more different molecular weight polyethers, such as a blend of 2,000 Mn and 1,000 Mn PTMEG.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecule with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 2,2,4-trimethyl-1,6-hexanediol, 1,10-decanediol, hydrogenated dilinoleylglycol, hydrogenated dioleylglycol, 3-methyl-1,5-pentanediol; and cycloaliphatic diols such as 1,3-cyclohexanediol, 1,4-dimethylolcyclohexane, 1,4-cyclohexanediol-, 1,3-dimethylolcyclohexane-, 1,4-endomethylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate.

Suitable polysiloxane polyols include α-ω-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone.

In some embodiments, the polysiloxanes may be represented by one or more compounds having the following formula:

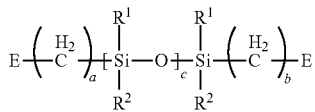

in which: each R1 and R2 are independently a 1 to 4 carbon atom alkyl group, a benzyl, or a phenyl group; each E is OH or $NHR^3$ where $R^3$ is hydrogen, a 1 to 6 carbon atoms alkyl group, or a 5 to 8 carbon atoms cyclo-alkyl group; a and b are each independently an integer from 2 to 8; c is an integer from 3 to 50. In amino-containing polysiloxanes, at least one of the E groups is $NHR^3$. In the hydroxyl-containing polysiloxanes, at least one of the E groups is OH. In some embodiments, both $R^1$ and $R^2$ are methyl groups.

Suitable examples include α,ω-hydroxypropyl terminated poly(dimethysiloxane) and α,ω-amino propyl terminated poly(dimethysiloxane), both of which are commercially available materials. Further examples include copolymers of the poly(dimethysiloxane) materials with a poly(alkylene oxide).

Examples of dimer fatty acids that may be used to prepare suitable polyester polyols include Priplast™ polyester glycols/polyols commercially available from Croda and Radia® polyester glycols commercially available from Oleon.

While any polyols described herein may be used in the present invention, in one embodiment, the polyol component comprises a polycarbonate polyol. In another embodiment, the polyol component comprises a polyether polyol. In another embodiment, the polyol component comprises a polycaprolactone polyol.

The Isocyanate Component

The thermoplastic polyurethane-urea compositions described herein are made using a polyisocyanate component. The polyisocyanate and/or polyisocyanate component includes one or more polyisocyanates. In some embodiments, the polyisocyanate component includes one or more diisocyanates.

Examples of useful polyisocyanates include aromatic diisocyanates such as 4,4'-methylenebis(phenyl isocyanate) (MDI), m-xylene diisocyanate (XDI), phenylene-1,4-diisocyanate, naphthalene-1,5-diisocyanate, and toluene diisocyanate (TDI); as well as aliphatic diisocyanates such as isophorone diisocyanate (IPDI), 1,4-cyclohexyl diisocyanate (CHDI), hexamethylene-1,6-diisocyanate (HDI), 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, decane-1,10-diisocyanate, lysine diisocyanate (LDI), 1,4-butane diisocyanate (BDI), isophorone diisocyanate (IPDI), 3,3'-dimethyl-4,4'-biphenylene diisocyanate (TODI), 1,5-naphthalene diisocyanate (NDI), and dicyclohexylmethane-4,4'-diisocyanate (H12MDI). Mixtures of two or more polyisocyanates may be used.

In some embodiments, the polyisocyanate used to prepare the TPU and/or TPU compositions described herein is at least 50%, on a weight basis, a cycloaliphatic diisocyanate. In some embodiments, the polyisocyanate includes an α, ω-alkylene diisocyanate having from 5 to 20 carbon atoms.

The Chain Extender Component

The thermoplastic polyurethane-urea compositions described herein are made using a chain extender component which comprises a diamine. The primary chain extender for the present invention is a hindered aromatic diamine compound. Examples of such compounds include but are not limited to diethyltoluenediamine, cyclopentenylenediamine, tertiarybutyltoluenediamine, butenyltoluenediamine, methylene bis(orthochloroaniline), chlorotoluenediamine, methylenedianiline and the like. In one embodiment, the chain extender component consists of or consists essentially of a hindered aromatic diamine compound. In one embodiment, the chain extender component consists of or consists essentially of diethyltoluenediamine (DETDA).

The thermoplastic polyurethane-urea composition of the present invention may also comprise a co-chain extender selected from chain extenders known in the art. Suitable co-chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy) phenyl]propane (HEPP), hexamethylenediol, heptanediol, nonanediol, dodecanediol, 3-methyl-1,5-pentanediol, ethylenediamine, butanediamine, hexamethylenediamine, and hydroxyethyl resorcinol (HER), and the like, as well as mixtures thereof. In some embodiments the chain extender includes BDO, HDO, 3-methyl-1,5-pentanediol, or a combination thereof. In some embodiments, the co-chain extender may comprise alkylene substituted spirocyclic compound comprising an alkylene substituted saturated spirocyclic-diol (PSG), or a combination thereof. In some embodiments, the co-chain extender includes BDO. In some embodiments, the reaction to form the thermoplastic polyurethane-urea composition of the present invention is substantially free of co-chain extender.

Additional Additives

The compositions of the present invention may further include additional useful additives, where such additives can be utilized in suitable amounts. These optional additional additives include opacifying pigments, colorants, mineral and/or inert fillers, stabilizers including light stabilizers, lubricants, UV stabilizers (including UV absorbers), processing aids, antioxidants, anti-ozonates, and other additives as desired. Useful additional additives also include nanoparticles, nanotubes, impact modifiers, flame retardants, conductive polymers, static dissipative materials, and combinations thereof.

Suitable opacifying pigments include titanium dioxide, zinc oxide, and titanate yellow. Suitable tinting pigments include carbon black, yellow oxides, brown oxides, raw and burnt sienna or umber, chromium oxide green, cadmium pigments, chromium pigments, and other mixed metal oxide and organic pigments. Suitable fillers include diatomaceous earth (superfloss), clay, silica, talc, mica, wallostonite, barium sulfate, and calcium carbonate. If desired, stabilizers such as antioxidants can be used and include phenolic antioxidants, while useful photo stabilizers include organic phosphates, and organotin thiolates (mercaptides). Suitable lubricants include metal stearates, paraffin oils and amide waxes. Suitable UV absorbers include 2-(2'-hydroxyphenol) benzotriazoles and 2-hydroxybenzophenones. Additives can also be used to improve the hydrolytic stability of the TPU polymer. Each of these optional additional additives described above may be present in, or excluded from, the compositions of the present invention.

When present, these additional additives may be present in the compositions of the present invention from 0 or 0.01 to 30, 15, 20, 5 or 2 weight percent of the composition. These ranges may apply separately to each additional additive present in the composition or to the total of all additional additives present.

The Process

The three reactants (the polyol intermediate, the diisocyanate, and the chain extender) may be reacted together to form the thermoplastic polyurethane-urea composition of this invention. One of the features that makes the present composition unique is that it can be made by the so-called "one-shot" process where all three reactants are added to an extruder reactor and reacted. The ratio of moles of total isocyanate to the total number of isocyanate reactive groups (i.e. OH from polyol and primary or secondary amine from chain extender) can be from about 0.95 to about 1.10, or from about 0.96 to about 1.02, and even from about 0.97 to about 1.005. Reaction temperatures utilizing a urethane catalyst can be from about 175 to about 245° C., and in another embodiment from 180 to 220° C.

After exiting the extruder, the composition is normally pelletized and stored in moisture proof packaging and is ultimately sold in pellet form. It should be understood that the composition would not always need to be pelletized, but rather could be extruded directly from the reaction extruder through a die into a final product profile.

The melt processable thermoplastic polyurethane-urea elastomers of the present invention may be obtained by polymerizing a polyol component, an isocyanate component, and a hindered aromatic diamine component in a reactive extruder without solvent present. An important aspect of the present invention is controlling the urea content of the thermoplastic polyurethane-urea composition. The urea content is controlled by the amount of amine chain extender. In one embodiment, the composition has no more than 20 mol % urea, for example, less than 20 mol % urea, further for example, less than 18 mol % urea, even further for example, about 2 mol % to 19 mol % urea, and even further for example about 5 mol % to 18 mol % urea.

Optionally, the polymerizations involved may be carried out in the presence of a catalyst. Suitable catalysts include alkaline catalysts, Lewis acid catalysts, as well as other catalysts known to those skilled in the art.

The polymerization described above may be carried out in an internal mixing apparatus, including a continuous processing internal mixing apparatus. Examples include reactive extruders and similar equipment. The equipment used in the processes of the present invention may include batch equipment, continuous equipment, or combinations thereof. In some embodiments, the processes of the present invention are at least partially continuous and in other embodiments the processes are fully continuous. The processes may also include the use of one or more extruders, either in series or parallel, in order to produce the materials described above.

In some embodiments, the materials of the present invention are prepared in one or more twin screw extruders. Suitable twin screw extruders include co-rotating twin screw extruders as well as series of such extruders.

In some embodiments, the elastomers of the present invention may be prepared by feeding the polyol component, isocyanate component, and hindered aromatic diamine chain extender component into a heated internal mixer. The materials may be fed as separate components. The optional catalyst, when present, may be added as a separate component or pre-mixed with one of the other components. If any additional additives are to be present, they may be added at any point along the internal mixer, or may be blended into the elastomer after the polymerization is complete, in a second internal mixer or even in a batch mixer. Vacuum may be applied near the exit of the internal mixer, to remove volatile components, and other steps described above may be included as well. The resulting elastomer exiting the second internal mixer may be sent through a water bath and/or may pass through a size reduction device, such as a strand cutter or under water pelletizer.

In one embodiment, the thermoplastic polyurethane-urea composition has a Shore A Hardness of about 60 A to about 95 A.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which sets forth particularly advantageous embodiments. While the examples are provided to illustrate the present invention, they are not intended to limit it.

Examples

TPU compositions as set forth in Table I were prepared in a continuous bulk polymerization process in a in a twin screw extruder. The compositions made are summarized in Table I.

TABLE I

| Ex. | Polyol | Di-Isocyanate | Chain Extender | Urea Content (mol %) |
|---|---|---|---|---|
| C1 | PTMEG(1000 MW) | MDI | BDO | 0% |
| C2 | Polycarbonate(2000 MW) | MDI | BDO | 0% |
| C3 | Polycarbonate(2000 MW) | MDI | PSG | 0% |
| C4 | Polycarbonate(2000 MW) | MDI | PSG | 0% |
| C5 | Polycarbonate(2000 MW) | MDI | 2-Methyl-1,5-diaminopentane | 12.9% |
| C6 | Polycarbonate(2000 MW) | MDI | 1,6-Diaminohexane | 12.9% |
| C7 | Polycarbonate(2000 MW) | MDI | DETDA | 20% |
| Ex. 1 | PTMEG(1000 MW) | MDI | DETDA/BDO | 5.9% |
| Ex. 2 | PTMEG(1000 MW) | MDI | DETDA | 7.5% |
| Ex. 3 | PTMEG(2000 MW) | MDI | DETDA | 7.5% |
| Ex. 4 | Polycaprolactone polyol (2000 MW) | MDI | DETDA/BDO | 5.9% |
| Ex. 4 | Polycaprolactone polyol (2000 MW) | MDI | DETDA | 7.2% |
| Ex. 5 | Polycarbonate (2000 MW) | MDI | DETDA | 12.8% |
| Ex. 6 | Polycarbonate (2000 MW) | MDI | DETDA | 17.6% |
| Ex. 7 | Polycarbonate (2000 MW) | MDI | DETDA | 8.4% |
| Ex. 8 | Polycarbonate (2000 MW) | MDI | DETDA | 7.2% |

Comparative Examples C5 and C6 could not form high molecular weight polymers, the reaction product was macrophase separated and unusable. As illustrated by comparison of C5 and C6 to the inventive Examples Ex. 1-8, it is seen that the use of a hindered aromatic diamine can be used to form a thermoplastic, melt-processable polyurethane-urea composition using a continuous bulk process in a reactive extruder. A similar composition cannot be made using aliphatic diamines.

Comparative Example C7 formed a highly cross-linked gel, which was not melt-processable. This is believed to be caused by the higher mol % urea in the composition. In contrast, all of the Inventive Examples (Ex. 1-Ex. 8), with lower urea mol %, formed melt-processable thermoplastic poldyurethane-urea compositions.

The thermoplastic polyurethanes of Comparative Examples C1-C4 and the inventive examples Ex. 7 and Ex. 8, were tested for short term heat aging performance for 150° C. temperature rating according to UL 1581. Injection-molded plaques of the TPUs listed were held at 180C for 7 days and then the tensile strength retention and percent elongation retention were tested. 75% retention for both tensile strength and elongation is required to pass the UL1581 heat aging tests. Tensile strength and % elongation was measured before and after heat aging according to ASTM D412. The results are summarized in Table II.

TABLE II

|  | C1 | C2 | C3 | C4 | Ex. 7 | Ex. 8 |
|---|---|---|---|---|---|---|
| Tensile Strength Before (psi) | 9094 | 8655 | 6678 | 5663 | 4539 | 4672 |
| Tensile Strength After (psi) | 1387 | 4053 | 2547 | 2216 | 4983 | 4812 |
| Elongation Before (%) | 438 | 374 | 285 | 361 | 452 | 470 |
| Elongation After (%) | 3 | 154 | 322 | 311 | 574 | 582 |
| Tensile Strength Retention (%) | 15 | 47 | 38 | 49 | 109.8 | 103 |
| Elongation Retention (%) | 1 | 41 | 113 | 86 | 127 | 123.8 |

The inventive examples illustrate that the thermoplastic polyurethane-urea compositions of the present invention are able to pass the UL 1581 short term heat aging tests for 150° C. temperature rating while other thermoplastic materials are not able to.

Additional TPU compositions as set forth in Table III were prepared in a batch polymerization process. The compositions made and test results are summarized in Table III.

TABLE III

|  | Ex. C8 | Ex. 9 | Ex. 10 |
|---|---|---|---|
| Diisocyanate | MDI | MDI | MDI |
| Polyol | EG-BDO-Adipate | EG-BDO-Adipate | EG-BDO-Adipate |
| Chain Extender | BDO | BDO/DETDA | BDO/DETDA |
| Hard Segment (%) | 20 | 20 | 20 |
| DETDA wt % | 0 | 2.14 | 3.07 |
| Creep (%) | 25 | 6.25 | 12.5 |
| TMA Onset Temperature (° C.) ASTM E2347 | 131 | 170 | 196 |
| Glass Transition (Tan Delta ° C.)[1] (DMA) | −34 | −30 | −32 |
| Melting Temperature (° C.)[2] (DMA) | 186 | NA | NA |
| Breadth of Rubbery Plateau[3] (° C.) | 95 | 170 | 185 |

[1]Temperature where Tan Delta = 1
[2]Temperature where G' (Storage modulus) = 0
[3]Region where G' is temperature insensitive Creep measurements were made using thee 30 mil, 1"×6" strips of each TPU were also subjected to creep test. Each strip was clamped in between metal grips (with rubber pads) with 2 inch gauge length. These clamped strips were hanged with 110 gram effective weight in an oven for 60 minutes at 130° C. Sample was checked every 15 minutes to make sure it didn't snap. After an hour of exposure, sample was removed from the oven and dimensional changes were measured and reported. Dynamic Mechanical Analysis (DMA) measurements were conducted using parallel plate configuration from −100° C. to 250° C. with 2° C./min heating rate at 0.1% strain using 1 Hz frequency.

The TPU-urea networks of Examples 9 and 10 exhibit much better creep resistance and higher TMA onset temperatures compared to a similarly formulated thermoplastic polyurethane. Higher TMA on-set temperature and lower creep values for the EXP 8 and EXP 9 compared to the C8 control sample suggest that the TPU-Urea networks showed higher resistance. In addition, the TPU-urea networks of Examples 9 and 10 exhibit more temperature insensitive storage modulus performance as shown by a a much broader breadth of rubbery plateau and higher melting temperatures, again, suggesting improved heat resistance.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values, ppm values and parts values are on a weight basis. Unless otherwise indicated, each chemical or composition referred to herein should be interpreted as being a commercial grade material which may contain the isomers, by-products, derivatives, and other such materials which are normally understood to be present in the commercial grade. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

We claim:

1. A process for making a melt-processable thermoplastic polyurethane-urea elastomer composition comprising:
   (1) adding a reaction mixture to a heated extruder, said reaction mixture comprising (a) a diol having a number average molecular weight of 700 to 4000, (b) an isocyanate component; and (c) a chain extender component, said chain extender component comprising a hindered aromatic diamine;
   (2) reacting said diol, said isocyanate component, and said chain extender component in a one-shot polymerization process in said heated extruder to form a thermoplastic polyurethane-urea elastomer composition, wherein the composition comprises less than 20 mol % urea;
   (3) cooling said thermoplastic polyurethane-urea elastomer composition; and
   (4) processing said thermoplastic polyurethane-urea elastomer composition.

2. The process of claim 1, wherein said processing step includes forming pellets of polyurethane-urea elastomer composition.

3. The process of claim 1 wherein the reaction mixture is substantially free of solvent.

4. The process of claim 1 wherein the chain extender component comprises diethyltoluenediamine.

5. The process of claim 1 wherein the diol comprises a polycarbonate diol.

6. A process for making a molded article from a thermoplastic polyurethane-urea composition comprising:
   (1) adding a reaction mixture to a heated extruder, said reaction mixture comprising (a) a diol having a number average molecular weight of 700 to 4000, (b) an isocyanate component; and (c) a chain extender component, said chain extender component comprising diethyltoluenediamine;
   (2) reacting said polyol component, said isocyanate component, and said chain extender component in a one-shot polymerization process in said heated extruder to form a thermoplastic polyurethane-urea elastomer composition, wherein the composition comprises less than 20 mol % urea;
   (3) cooling said thermoplastic polyurethane-urea elastomer composition;
   (4) processing said thermoplastic polyurethane-urea elastomer composition;
   (5) melting said thermoplastic polyurethane-urea elastomer composition;
   (6) molding the melted thermoplastic polyurethane-urea elastomer composition into an article.

7. The process of claim 6, wherein said processing step includes forming pellets of polyurethane-urea elastomer composition.

8. The process of claim 6 wherein the reaction mixture is substantially free of solvent.

9. The process of claim 6 wherein the diol component comprises a polycarbonate diol.

10. The process of claim 1, wherein the isocyanate component comprises an aromatic isocyanate.

11. The process of claim 6, wherein the isocyanate component comprises an aromatic isocyanate.

12. The process of claim 1, wherein the diol comprises polymerized tetrahydrofuran (PTMEG).

13. The process of claim 6, wherein the diol comprises polymerized tetrahydrofuran (PTMEG).

14. The process of claim 1, wherein the diol comprises polycaprolactone diol.

15. The process of claim 6, wherein the diol comprises polycaprolactone diol.

* * * * *